United States Patent
Li et al.

(10) Patent No.: US 12,500,814 B2
(45) Date of Patent: Dec. 16, 2025

(54) COMMUNICATION METHOD AND APPARATUS

(71) Applicant: HUAWEI TECHNOLOGIES CO., LTD., Guangdong (CN)

(72) Inventors: Yexing Li, Shanghai (CN); Xianming Li, Shanghai (CN); Yijun Yu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/603,141

(22) Filed: Mar. 12, 2024

(65) Prior Publication Data

US 2024/0223456 A1    Jul. 4, 2024

Related U.S. Application Data

(63) Continuation of application No. PCT/CN2022/118755, filed on Sep. 14, 2022.

(30) Foreign Application Priority Data

Sep. 17, 2021  (CN) .......................... 202111092033.X

(51) Int. Cl.
  *G06F 15/173*   (2006.01)
  *H04L 41/0894*  (2022.01)
(52) U.S. Cl.
  CPC ................................ *H04L 41/0894* (2022.05)
(58) Field of Classification Search
  CPC .................................................. H04L 41/0894
  See application file for complete search history.

(56) References Cited

U.S. PATENT DOCUMENTS

2024/0214287 A1*  6/2024  Abdelkader ........ H04L 41/0896

FOREIGN PATENT DOCUMENTS

EP    4072070 A1    10/2022
WO    2021134343 A1   7/2021

OTHER PUBLICATIONS

3GPP TR 28.812 V17.1.0 (Dec. 2020):"3rd Generation Partnership Project;Technical Specification Group Services and System Aspects;Telecommunication management; Study on scenarios for Intent driven management services for mobile networks (Release 17)", total 45 pages.

(Continued)

*Primary Examiner* — Joseph R Maniwang

(57) ABSTRACT

This application provides a communication method and apparatus. The communication method includes: A first device receives first information from a second device. The first information includes information about an evaluation value of a first parameter of a first intent. When the evaluation value of the first parameter does not reach an expression value of the first parameter, the first device sends second information to the second device. The second information is used to enable the evaluation value of the first parameter to reach the expression value of the first parameter. In this way, the first device may perform an intent management operation based on information about the evaluation value and the expression value of the first parameter. This avoids a case in which the expression value of the intent parameter is improperly adjusted, and improves system running performance.

17 Claims, 6 Drawing Sheets

(56) References Cited

OTHER PUBLICATIONS

ETSI GS ENI 001 V2.0.10 (Jul. 2019):"Experiential Networked Intelligence (ENI);ENI use cases", total 89 pages.
3GPP TS 28.312 V17.3.0 (Mar. 2023):"3rd Generation Partnership Project;Technical Specification Group Services and System Aspects;Management and orchestration;Intent driven management services for mobile networks(Release 17)", total 56 pages.

* cited by examiner

COMMUNICATION METHOD AND APPARATUS

CROSS-REFERENCE TO RELATED APPLICATIONS

This application is a continuation of International Patent Application No. PCT/CN2022/118755, filed on Sep. 14, 2022, which claims priority to Chinese Patent Application No. 202111092033.X, filed on Sep. 17, 2021. The disclosures of the aforementioned applications are hereby incorporated by reference in their entireties.

TECHNICAL FIELD

This application relates to the communication field, and further, to a communication method and apparatus.

BACKGROUND

Currently, an intent-driven management service (intent-driven management service, IDMS) can be used to reduce management complexity of communication network infrastructures and improve operation and maintenance efficiency in a multi-vendor (multi-vendor) scenario.

However, in an existing intent-driven management service, because an intent consumer cannot learn of a specific situation in which an intent is unfulfilled, an expression value of an intent parameter is randomly adjusted. As a result, the expression value of the intent parameter may be adjusted to be excessively low. In addition, because the intent consumer cannot learn of a reason why the intent is unfulfilled, the intent consumer can perform an operation on each field of the intent only based on guessing to fulfill a target of the intent. A large quantity of negotiations exist between the intent consumer and an intent producer, and system operation and maintenance resources are consumed.

SUMMARY

This application provides a communication method and apparatus, so that an intent consumer can obtain operation details of an intent. In this way, the intent consumer may perform an intent management operation based on an obtained intent fulfillment status, and purposefully adjust an expression value of an intent parameter. This avoids a case in which the expression value of the intent parameter is improperly adjusted because the intent consumer cannot learn of a specific situation in which the intent is unfulfilled, and improves system running performance.

According to a first aspect, a communication method is provided, including: A first device receives first information from a second device, where the first information includes information about an evaluation value of a first parameter, and the first parameter is a parameter of a first intent. When the evaluation value of the first parameter does not reach an expression value of the first parameter, the first device sends second information to the second device, where the second information is used to enable the evaluation value of the first parameter to reach the expression value of the first parameter.

An intent consumer block is deployed on the first device, and an intent producer block is deployed on the second device. The first device and the second device may be two different devices, and the intent consumer block and the intent producer block are deployed on different devices. Alternatively, the first device and the second device may be a same device, and the intent consumer block and the intent producer block are deployed on a same device.

Based on the foregoing solution, the first device receives the first information from the second device, where the first information includes the information about the evaluation value of the first parameter of the first intent. In addition, when the evaluation value of the first parameter does not reach the expression value of the first parameter, the first device sends the second information to the second device. The first device knows information about the expression value of the first parameter. In this way, the first device may perform an intent management operation based on information about the evaluation value and the expression value of the first parameter of the first intent. For example, the first device sends, to the second device, information used to enable the evaluation value of the first parameter to reach the expression value of the first parameter, so that the first device may purposefully adjust an expression value of an intent parameter. This avoids a case in which the expression value of the intent parameter is improperly adjusted because the first device cannot learn of a specific situation in which an intent is unfulfilled, and improves system running performance.

With reference to the first aspect, in some implementations of the first aspect, the first device sends third information to the second device, where the third information includes information about a parameter that needs to be fed back by the second device, and the information about the parameter that needs to be fed back includes information about the first parameter.

Based on the foregoing solution, the first device may send, to the second device, information indicating the parameter that needs to be fed back by the second device, so that the second device feeds back information about the corresponding parameter to the first device. In this way, the first device may learn of a reason why the intent parameter is unfulfilled. This avoids a case in which the first device can perform an operation on each field of the intent only based on guessing, and a large quantity of negotiations exist between the first device and the second device, saves system operation and maintenance resources, and improves the system running performance.

With reference to the first aspect, in some implementations of the first aspect, the first information further includes modification indication information, and the modification indication information includes information about modified expressions of some or all parameters of the first parameter.

With reference to the first aspect, in some implementations of the first aspect, the second information further indicates that the first device accepts modification of some or all parameters of the first parameter.

With reference to the first aspect, in some implementations of the first aspect, when the first device accepts the modification of some parameters of the first parameter, the first device sends at least one piece of first creation request information and/or first modification request information to the second device, where the first creation request information is used to request to create a second intent, a parameter of the second intent includes at least one parameter of the first parameter, and the first modification request information indicates to modify an expression value of the at least one parameter of the first parameter.

Based on the foregoing solution, the first device may send the at least one piece of first creation request information and/or first modification request information to the second device, to create an intent, and/or adjust the expression value of the intent parameter, so that the intent can be met, and the system running performance can be improved.

With reference to the first aspect, in some implementations of the first aspect, the second information further indicates that the first device does not accept modification of some or all parameters of the first parameter.

With reference to the first aspect, in some implementations of the first aspect, the second information includes second modification request information and/or at least one piece of second creation request information, the second modification request information indicates to modify an expression value of a parameter that is of the first parameter and whose evaluation value does not reach the expression value of the parameter, the second creation request information indicates to create a third intent, and a parameter of the third intent includes the parameter that is of the first parameter and whose evaluation value does not reach the expression value of the parameter.

Based on the foregoing solution, the first device may send the at least one piece of second modification request information and/or the second creation request information to the second device, to adjust the expression value of the intent parameter, and/or create an intent, so that the intent can be met, and the system running performance can be improved.

With reference to the first aspect, in some implementations of the first aspect, the first parameter includes at least one of the following parameters: a target, a constraint, an application area, preference information, or fulfillment time.

According to a second aspect, a communication method is provided, including: A second device sends first information to a first device, where the first information includes information about an evaluation value of a first parameter, and the first parameter is a parameter of a first intent. The second device receives second information from the first device, where the second information is used to enable the evaluation value of the first parameter to reach an expression value of the first parameter.

For beneficial effects of the foregoing solution, refer to corresponding descriptions in the first aspect. For brevity, details are not described herein again in this application.

With reference to the second aspect, in some implementations of the second aspect, the second device receives third information from the first device, where the third information includes information about a parameter that needs to be fed back by the second device, and the information about the parameter that needs to be fed back includes information about the first parameter.

For beneficial effects of the foregoing solution, refer to corresponding descriptions in the first aspect. For brevity, details are not described herein again in this application.

With reference to the second aspect, in some implementations of the second aspect, expressions of some or all parameters of the first parameter are modified.

With reference to the second aspect, in some implementations of the second aspect, the first information further includes modification indication information, and the modification indication information includes information about modified expressions of some or all parameters of the first parameter.

With reference to the second aspect, in some implementations of the second aspect, the second information further indicates that the first device accepts modification of some or all parameters of the first parameter.

With reference to the second aspect, in some implementations of the second aspect, the second device receives at least one piece of first creation request information and/or first modification request information from the first device, where the first creation request information is used to request to create a second intent, a parameter of the second intent includes at least one parameter of the first parameter, and the first modification request information indicates to modify an expression value of the at least one parameter of the first parameter.

For beneficial effects of the foregoing solution, refer to corresponding descriptions in the first aspect. For brevity, details are not described herein again in this application.

With reference to the second aspect, in some implementations of the second aspect, the second information further indicates that the first device does not accept modification of some or all parameters of the first parameter.

With reference to the second aspect, in some implementations of the second aspect, the second information includes second modification request information and/or at least one piece of second creation request information, the second modification request information indicates to modify an expression value of a parameter that is of the first parameter and whose evaluation value does not reach the expression value of the parameter, the second creation request information indicates to create a third intent, and a parameter of the third intent includes the parameter that is of the first parameter and whose evaluation value does not reach the expression value of the parameter.

For beneficial effects of the foregoing solution, refer to corresponding descriptions in the first aspect. For brevity, details are not described herein again in this application.

With reference to the second aspect, in some implementations of the second aspect, the first parameter includes at least one of the following parameters: a target, a constraint, an application area, preference information, or fulfillment time.

According to a third aspect, a communication apparatus is provided, including a transceiver module and a processing module. The transceiver module is configured to receive first information from a second device, where the first information includes information about an evaluation value of a first parameter, and the first parameter is a parameter of a first intent. The processing module is configured to determine whether the evaluation value of the first parameter reaches an expression value of the first parameter. The transceiver module is further configured to enable a first device to send second information to the second device when the evaluation value of the first parameter does not reach the expression value of the first parameter, where the second information is used to enable the evaluation value of the first parameter to reach the expression value of the first parameter.

For beneficial effects of the foregoing solution, refer to corresponding descriptions in the first aspect. For brevity, details are not described herein again in this application.

With reference to the third aspect, in some implementations of the third aspect, the transceiver module is further configured to send third information to the second device, where the third information includes information about a parameter that needs to be fed back by the second device, and the information about the parameter that needs to be fed back includes information about the first parameter.

For beneficial effects of the foregoing solution, refer to corresponding descriptions in the first aspect. For brevity, details are not described herein again in this application.

With reference to the third aspect, in some implementations of the third aspect, the first information further includes modification indication information, and the modification indication information includes information about modified expressions of some or all parameters of the first parameter.

With reference to the third aspect, in some implementations of the third aspect, the second information further indicates that the first device accepts modification of some or all parameters of the first parameter.

With reference to the third aspect, in some implementations of the third aspect, when the first device accepts the modification of some parameters of the first parameter, the transceiver module is further configured to send at least one piece of first creation request information and/or first modification request information to the second device, where the first creation request information is used to request to create a second intent, a parameter of the second intent includes at least one parameter of the first parameter, and the first modification request information indicates to modify an expression value of the at least one parameter of the first parameter.

For beneficial effects of the foregoing solution, refer to corresponding descriptions in the first aspect. For brevity, details are not described herein again in this application.

With reference to the third aspect, in some implementations of the third aspect, the second information further indicates that the first device does not accept modification of some or all parameters of the first parameter.

With reference to the third aspect, in some implementations of the third aspect, the second information includes second modification request information and/or at least one piece of second creation request information, the second modification request information indicates to modify an expression value of a parameter that is of the first parameter and whose evaluation value does not reach the expression value of the parameter, the second creation request information indicates to create a third intent, and a parameter of the third intent includes the parameter that is of the first parameter and whose evaluation value does not reach the expression value of the parameter.

For beneficial effects of the foregoing solution, refer to corresponding descriptions in the first aspect. For brevity, details are not described herein again in this application.

With reference to the third aspect, in some implementations of the third aspect, the first parameter includes at least one of the following parameters: a target, a constraint, an application area, preference information, or fulfillment time.

According to a fourth aspect, a communication apparatus is provided, including: a processing module, configured to generate first information, where the first information includes information about an evaluation value of a first parameter, and the first parameter is a parameter of a first intent; and a transceiver module, configured to send the first information, and receive second information from a first device, where the second information is used to enable the evaluation value of the first parameter to reach an expression value of the first parameter.

For beneficial effects of the foregoing solution, refer to corresponding descriptions in the first aspect. For brevity, details are not described herein again in this application.

With reference to the fourth aspect, in some implementations of the fourth aspect, the transceiver module is further configured to receive third information from the first device, where the third information includes information about a parameter that needs to be fed back by a second device, and the information about the parameter that needs to be fed back includes information about the first parameter.

With reference to the fourth aspect, in some implementations of the fourth aspect, the processing module is further configured to modify expressions of some or all parameters of the first parameter.

With reference to the fourth aspect, in some implementations of the fourth aspect, the first information further includes modification indication information, and the modification indication information includes information about modified expressions of some or all parameters of the first parameter.

With reference to the fourth aspect, in some implementations of the fourth aspect, the second information further indicates that the first device accepts modification of some or all parameters of the first parameter.

With reference to the fourth aspect, in some implementations of the fourth aspect, the transceiver module is further configured to receive at least one piece of first creation request information and/or first modification request information from the first device, where the first creation request information is used to request to create a second intent, a parameter of the second intent includes at least one parameter of the first parameter, and the first modification request information indicates to modify an expression value of the at least one parameter of the first parameter.

For beneficial effects of the foregoing solution, refer to corresponding descriptions in the first aspect. For brevity, details are not described herein again in this application.

With reference to the fourth aspect, in some implementations of the fourth aspect, the second information further indicates that the first device does not accept modification of some or all parameters of the first parameter.

With reference to the fourth aspect, in some implementations of the fourth aspect, the second information includes second modification request information and/or at least one piece of second creation request information, the second modification request information indicates to modify an expression value of a parameter that is of the first parameter and whose evaluation value does not reach the expression value of the parameter, the second creation request information indicates to create a third intent, and a parameter of the third intent includes the parameter that is of the first parameter and whose evaluation value does not reach the expression value of the parameter.

For beneficial effects of the foregoing solution, refer to corresponding descriptions in the first aspect. For brevity, details are not described herein again in this application.

With reference to the fourth aspect, in some implementations of the fourth aspect, the first parameter includes at least one of the following parameters: a target, a constraint, an application area, preference information, or fulfillment time.

According to a fifth aspect, a communication apparatus is provided, including a processor and an interface circuit. The interface circuit is configured to receive a signal from another communication apparatus other than the communication apparatus and transmit the signal to the processor, or send a signal from the processor to the another communication apparatus other than the communication apparatus. The processor is configured to implement the method in any possible implementation of the first aspect or the second aspect by using a logic circuit or executing code instructions.

According to a sixth aspect, a computer-readable storage medium is provided. The computer-readable storage medium stores a computer program or instructions. When the computer program or the instructions is or are executed, the method in any possible implementation of the first aspect or the second aspect is implemented.

According to a seventh aspect, a computer program product including instructions is provided. When the instructions are run, the method in any possible implementation of the first aspect or the second aspect is implemented.

According to an eighth aspect, a computer program is provided. The computer program includes code or instructions. When the code or the instructions is or are run, the method in any possible implementation of the first aspect or the second aspect is implemented.

According to a ninth aspect, a chip system is provided. The chip system includes a processor, and may further include a memory, configured to implement the method in any possible implementation of the first aspect or the second aspect. The chip system may include a chip, or may include a chip and another discrete component.

According to a tenth aspect, a communication system is provided. The communication system includes the apparatuses in the third aspect and the fourth aspect.

DESCRIPTION OF EMBODIMENTS

The following describes technical solutions of embodiments in this application with reference to accompanying drawings.

The following describes the technical solutions of this application with reference to the accompanying drawings.

The technical solutions in embodiments of this application may be applied to various communication systems such as a 5th generation (5th generation, 5G) system, a new radio (new radio, NR) system, a long term evolution (long term evolution, LTE) system, an LTE frequency division duplex (frequency division duplex, FDD) system, an LTE time division duplex (time division duplex, TDD) system, and a universal mobile telecommunications system (universal mobile telecommunications system, UMTS), cloud video source encoding, decoding, rendering, network transmission including a core network and an access network of LTE, NR, and a 6th generation (6th generation, 6G) system air interface, and a device like a terminal head mounted display virtual reality (Virtual reality, VR) glasses.

Figure 1:
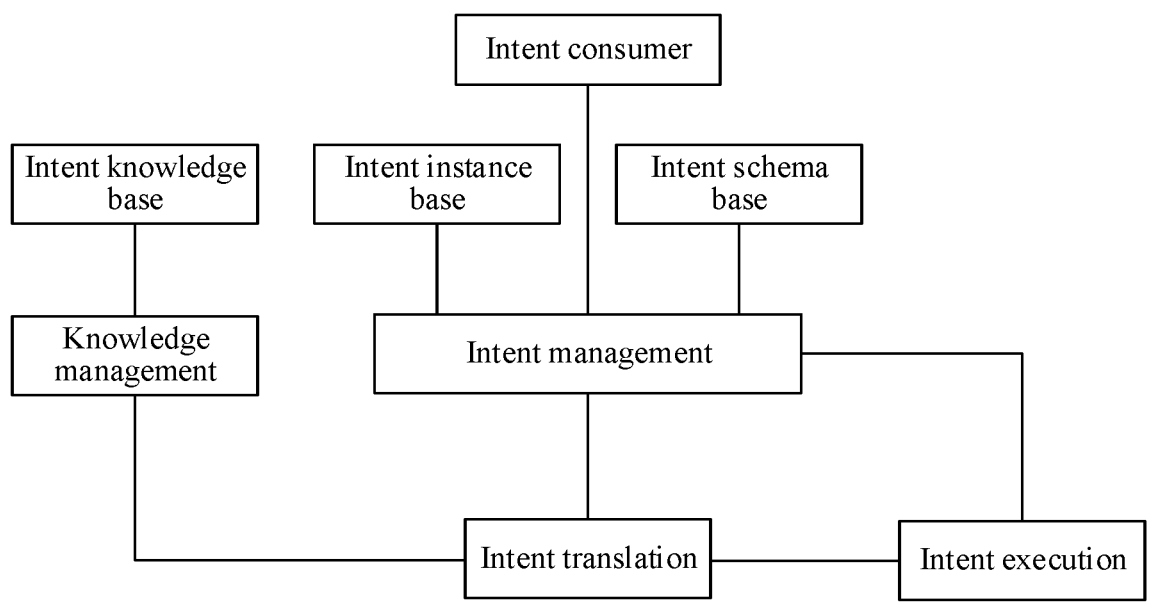
FIG. 1 is a schematic diagram of an intent architecture 100 applicable to an embodiment of this application.

FIG. 1 is a schematic diagram of an intent architecture 100 applicable to an embodiment of this application. As shown in FIG. 1, the intent architecture may be referred to as a wireless intent-driven network (wireless intent-driven network, wIDN) architecture. In actual deployment, an intent instance base (intent instance base) and an intent schema base (intent schema base) can be co-deployed with intent management (intent management) as sub-functions of the intent management. An intent knowledge base (intent knowledge base) can be co-deployed with knowledge management (knowledge management) as sub-functions of the knowledge management.

The intent instance base is used to store an intent instance. The intent schema base is used to store an intent schema. The intent management is used for managing the intent schema and the intent instance. The intent knowledge base is used to store intent knowledge. The knowledge management is used for managing the intent knowledge. An intent consumption entity may be a business support system (BSS), an operations support system (OSS), an application (APP), or a third-party user (user).

Figure 2:
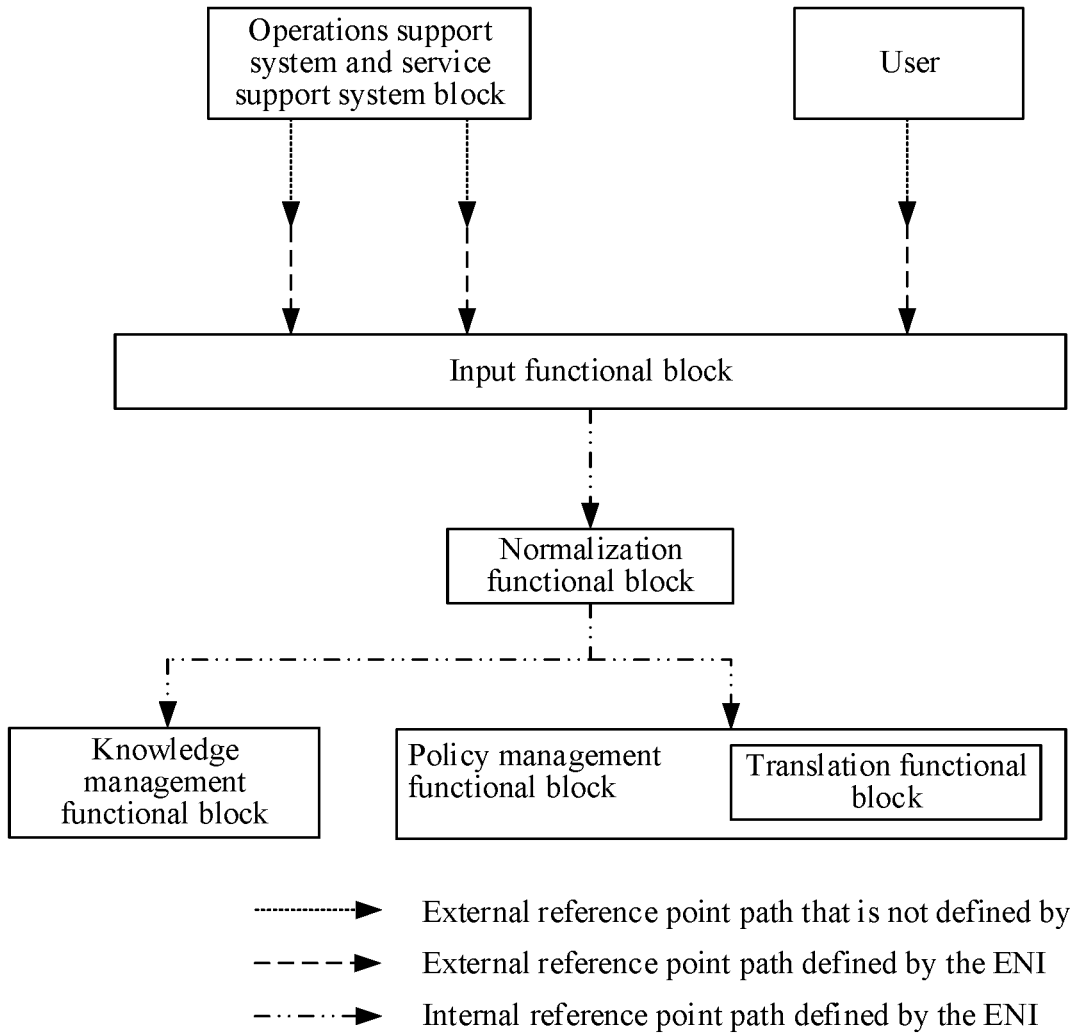
FIG. 2 is a schematic diagram of an intent architecture 200 applicable to an embodiment of this application.

FIG. 2 is a schematic diagram of an intent architecture 200 applicable to an embodiment of this application. As shown in FIG. 2, the intent architecture may be referred to as a European Telecommunications Standards Institute Experiential Networked Intelligence (European Telecommunications Standards Institute Experiential Networked Intelligence, ETSI ENI) architecture. A data ingestion functional block (data ingestion FB) is configured to receive data from an external system. A normalization functional block (normalization FB) is configured to normalize the data. A knowledge management functional block (knowledge management FB) is configured to analyze an existing network status and store intent knowledge and intent context knowledge. An intent translation functional block (intent translation FB) is configured to translate a received intent policy into a command that can be identified by an ENI internal system, and place the command in a policy management block (policy management FB). An operations support system and service support system block (OSS- and BSS-like functionality) is configured to input an intent to the ENI system. A user (user) is used to input an intent to the ENI system. A policy interface (eoss-eni-pol) between an operations support system (operations support system, OSS) and the ENI system is used to transfer a policy between the OSS and the ENI system.

A policy interface (ebss-eni-pol) between a business support system (business support system, BSS) and the ENI system is responsible for transferring a policy between the BSS and the ENI system.

A policy interface (eusr-eni-pol) between the user and the ENI system is responsible for transferring a policy between the user and the ENI system.

Figure 3:
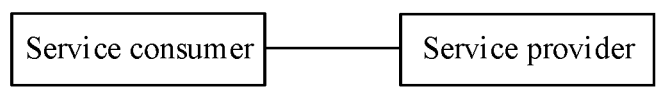
FIG. 3 is a schematic diagram of an intent architecture 300 applicable to an embodiment of this application.

FIG. 3 is a schematic diagram of an intent architecture 300 applicable to an embodiment of this application. As shown in FIG. 3, the intent architecture may be referred to as an intent-driven management system (intent-driven management system, DMS) architecture. A service consumer (an MnS consumer) may be an intent consumer, and may be a network management system (NMS) in an implementation. A service provider (an MnS producer) may be an intent service provider or an intent producer, and may be an element management system (EMS) in an implementation.

A correspondence among the foregoing three intent architectures may be shown in Table 1.

TABLE 1

| wIDN functional block | ENI functional block | IDMS functional block |
|---|---|---|
| Intent consumption entity | Operations support system and service support system block | Service consumer |

TABLE 1-continued

| wIDN functional block | ENI functional block | IDMS functional block |
|---|---|---|
| Intent management<br>Knowledge management<br>Intent translation<br>Intent decision-making and execution | New knowledge management<br>Knowledge management<br>Intent translation<br>Policy management | Service provider |

Functional blocks in the wIDN architecture and the ENI architecture may be used as sub-blocks of services in the IDMS architecture.

It should be understood that FIG. 1 to FIG. 3 are merely examples for description. This is not limited in this application.

It should be further understood that a network device in this application may be any device having a wireless transceiver function. The device includes but is not limited to: an evolved NodeB (evolved NodeB, eNB), a radio network controller (Radio Network Controller, RNC), a NodeB (NodeB, NB), a base station controller (Base Station Controller, BSC), a base transceiver station (Base Transceiver Station, BTS), a home base station (for example, a Home evolved NodeB, or a Home NodeB, HNB), a baseband unit (BaseBand Unit, BBU), an access point (Access Point, AP) in a wireless fidelity (Wireless Fidelity, WI-FI) system, a wireless relay node, a wireless backhaul node, a transmission point (transmission point, TP), a transmission and reception point (transmission and reception point, TRP), or the like. The device may alternatively be a gNB or a transmission point (TRP or TP) in a 5G system, for example, an NR system, or one or a group (including a plurality of antenna panels) of antenna panels of a base station in the 5G system. The device may alternatively be a network node that constitutes a gNB or a transmission point, for example, a baseband unit (BBU) or a distributed unit (distributed unit, DU).

In some deployments, a gNB may include a central unit (central unit, CU) and a DU. The gNB may further include an active antenna unit (active antenna unit, AAU for short). The CU implements some functions of the gNB, and the DU implements some functions of the gNB. For example, the CU is responsible for processing a non-real-time protocol and service, and implements functions of a radio resource control (radio resource control, RRC) layer and a packet data convergence protocol (packet data convergence protocol, PDCP) layer. The DU is responsible for processing a physical layer protocol and a real-time service, and implements functions of a radio link control (radio link control, RLC) layer, a media access control (media access control, MAC) layer, and a physical (physical, PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may alternatively be considered as being sent by the DU or sent by the DU and the AAU. It may be understood that the network device may be a device including one or more of a CU node, a DU node, and an AAU node. In addition, the CU may be classified into a network device in a radio access network (radio access network, RAN), or the CU may be classified into a network device in a core network (core network, CN). This is not limited in this application.

In embodiments of this application, a plurality of network function entities may be used to implement functions of the network device, and each network function entity is configured to implement some functions of the network device. These network function entities may be network elements in hardware elements, or may software functions run on dedicated hardware, or may be instantiated virtualization functions on a platform (for example, a cloud platform).

For ease of understanding embodiments of this application, the following first briefly describes several terms used in this application.

1. Intent (Intent)

The intent refers to an expectation of a system, including a requirement, a target, and a constraint that are applied to the system, but not including an implementation process of how to meet these parameters. This application includes the following concepts related to the intent:

(1) Intent fulfillment status (intentFulfilStatus): The intent fulfillment status is a status of an intent implementation result. The status is configured by a management service (management service, MNS) producer (an intent producer) and obtained by an MNS consumer (an intent consumer).

(2) An intent expression: The intent expression is an expression used to carry an intent. The expression includes an action name of the intent, an action attribute of the intent, a name of an object to which the intent is applied, and an attribute of the object to which the intent is applied, and has specific syntax and semantics.

(3) Intent translation: The intent translation is a process of converting an intent into an executable command/sub-intent/rule of the intent.

(4) Intent decision-making and execution: The Intent decision-making and execution is a process in which an executable command/sub-intent/rule of an intent is selected based on a network environment and fulfillment status of the intent, and the selected executable command/sub-intent/rule is delivered.

(5) Executable command of an intent: The executable command of the intent is a series of indications formed by performing operations such as translation and decision-making on the intent.

(6) Intent creation: The intent creation is a process in which an intent instance is created in an intent system and corresponding intent context is created.

(7) Intent maintenance: The intent maintenance is a process in which an executable command of an intent is adjusted based on a network environment change to fulfill an intent target as much as possible.

(8) Intent fulfillment: The intent fulfillment means that an intent system detects that a key performance indicator (key performance indication, KPI) value in a network reaches a target value of an intent expression.

(9) Intent status: The intent status identifies a status of an intent, including an activated state, a deactivated state, a conflict state, a sleep state, and the like.

(10) Intent knowledge base: The intent knowledge base is a date base used to store historical experience and intent knowledge needed for translation.

(11) Intent schema: The intent schema specifies syntax and semantics of an intent expression, including fields, a field value range, a field type, and a hierarchical relationship between the fields.

(12) Intent conflict: The intent conflict exists between two intents when the two intents cannot be fulfilled at the same time due to a conflict in intent expression, command execution, or semantics.

(13) Syntax conflict: The syntax conflict is a conflict in expressions of two intents. For example, the expressions of the two intents describe mutually exclusive expected targets for a same application object (such as a cell or a base station) under a same effective condition. In this case, the syntax conflict exists between the two intents.

(14) Semantic conflict: The semantic conflict is an inherent conflict in intrinsic descriptions of intent targets, which is difficult to identify at an intent expression level and an intent execution operation level, and is a deeper-level conflict between intents.

(15) Operation conflict: The operation conflict is a conflict that exists between two intents in terms of an execution operation (intent operation) after translation. In other words, operations of the two intents cannot be executed at the same time.

2. Network Management System

The network management system (network management system, NMS) is a management system responsible for operation, management, and maintenance of a network. A managed object may include an entity in the network, such as a network device, an application program, a server system, a router, a switch, a hub, and an auxiliary device (for example, an uninterruptible power system). A network view of a system may be provided. The NMS provides a manner for operators to manage networks of different regions and device vendors, so that a network administrator may comprehensively monitor an operating status of a network by using the NMS, to better manage and maintain the network. The NMS improves network availability and reliability, improves overall network operation efficiency, and reduces management costs.

3. Element Management System

The element management system (element management system, EMS) is a system that manages one or more telecommunication network units (NE) of a specific type. Generally, the EMS manages a function and capacity of each NE, but does not participate in communication between different NEs in a network.

To support communication between the NEs, the EMS needs to communicate with a higher-level NMS. The EMS is a basis of a telecommunications management network (telecom management network, TMN) hierarchical model-based operations support system (operations support system, OSS) architecture. This architecture enables a service provider (service provider, SP) to meet customer requirements for rapidly developing services, while meeting high-standard quality of service (quality of service, QoS) requirements.

The EMS provides a unified operation and maintenance function in a professional network field, focuses on internal network element management in a region, a network, and a subnetwork, and can manage and maintain a device and the network in an end-to-end manner. For example, one EMS may be used to manage an IP multimedia subsystem (IP multimedia subsystem, IMS) network and devices of one operator in a centralized manner. The devices include: a core network device, a data communication device, a next generation network (next generation network, NGN) device, a service device, and a third-party information technology (information technology, IT) device.

Currently, full network resource modeling and full network object management are used for defining a conventional northbound interface (itf-N). The NMS adds, deletes, modifies, and checks all southbound managed objects through operations such as configuration management (configuration management), performance management (performance management), and fault management (fault management). However, the foregoing manner not only raises a management and operation and maintenance threshold for the operator, but also exposes a problem of differentiation between device vendors. As a result, it is difficult to implement interoperability between different vendors.

To reduce management complexity of network infrastructures and improve operation and maintenance efficiency in a multi-vendor (multi-vendor) scenario, an intent-driven management service is introduced. The main solution is as follows:

The NMS does not directly manage network resource management (network resource management, NRM), only retains an intent model, and transmits only a vendor-agnostic (vendor-agnostic) intent expression on a northbound interface. This avoids a problem of implementation differentiation of device vendors.

The intent is expressed in a declarative manner. In other words, the intent only describes what (what) it is and does not involve how (how) to do. Only basic concepts in a wireless domain are needed to express the intent. This lowers the operation and maintenance threshold.

After receiving the intent, the EMS needs to translate the intent into a network demand and a specific execution operation based on a network status, and execute the demand and the operation to fulfill the intent.

However, in a current technology, an intent consumer can only learn of whether the intent is fulfilled. When the intent is unfulfilled, because the intent consumer does not know a reason why the intent is unfulfilled, the intent consumer can perform an operation on each field of the intent only based on guessing, and negotiate with an intent producer. As a result, a quantity of negotiations are large, and unnecessary operation and maintenance resources are consumed. In addition, because a target of the intent is randomly adjusted, during adjustment the intent consumer may adjust the target of the intent to be excessively low.

In view of this, this application provides a communication method and apparatus, to resolve the foregoing problem.

It should be understood that in the following embodiments, an intent consumer block is deployed on a first device, and an intent producer block is deployed on a second device. The first device and the second device may be two different devices, and the intent consumer block and the intent producer block are deployed on different devices. Alternatively, the first device and the second device may be a same device, and the intent consumer block and the intent producer block are deployed on a same device.

Figure 4:
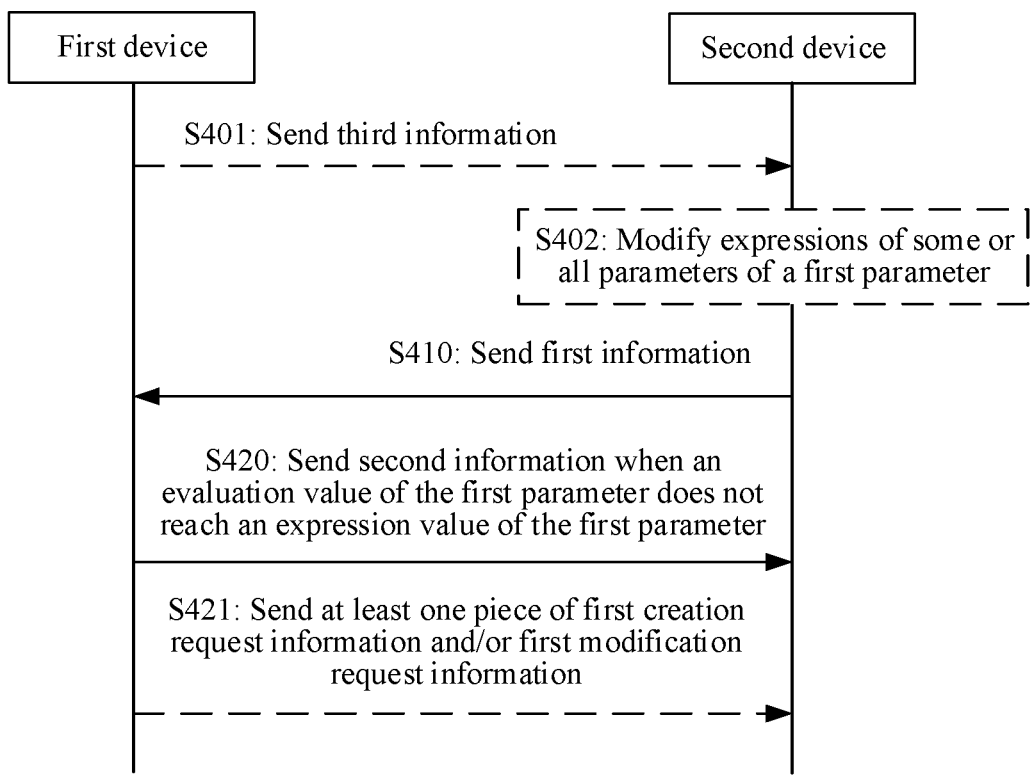
FIG. 4 is a schematic diagram of a communication method 400 according to an embodiment of this application.

FIG. 4 is a schematic diagram of a communication method 400 according to an embodiment of this application. As shown in FIG. 4, the method 400 includes the following steps.

S410: A second device sends first information to a first device. Correspondingly, the first device receives the first information from the second device.

For example, the second device may send the first information to the first device. The first information includes information about an evaluation value of a first parameter, and the first parameter is a parameter of a first intent.

Specifically, the second device may send the first information to the first device, so that the first device may obtain, based on the first information, a specific situation of whether the evaluation value of the first parameter reaches an expression value of the first parameter. The first device knows information about the expression value of the first parameter. The evaluation value of the first parameter is a value that is of the first parameter of the first intent and that is obtained through network real-time evaluation, and the expression value of the first parameter is a value of an expression of the first parameter of the first intent. When the evaluation value of the first parameter reaches the expression value of the first parameter, it may be considered that the first intent is fulfilled or the first intent is fulfilled. When the evaluation value of the first parameter does not reach the expression value of the first parameter, it may be considered that the first intent is unfulfilled or the first intent is unfulfilled. The first parameter includes at least one of the following parameters: a target, a constraint, an application area, preference information, or fulfillment time. In addition, the target is a state that an intent expects to be. For example, for a throughput optimization intent, a target of the intent may be that "a throughput is greater than 10 kbps". For a delay optimization intent, a target of the intent may be that "an end-to-end delay is less than 10 ms". The constraint is a constraint that needs to be followed in a process of fulfilling a target of the intent. For example, for a network deployment intent, a constraint may be frequency band information, transmission information, and the like. The application area is an area to which the intent is applied. For example, for a coverage optimization intent, an application area of the intent may be "Beijing Chaoyang District". The preference information refers to an intent object that is preferred or to which the intent is preferentially applied during an intent fulfillment process. For example, in an area, both a 5G base station and a 4G base station exist, and throughputs need to be improved. The throughput of the 5G base station may be preferentially improved based on the preference information. The fulfillment time refers to a time period during which the intent is fulfilled. For example, an energy saving intent expects to be fulfilled between 1:00 a.m. and 2:00 a.m.

In an implementation, when the first parameter is the target, the first information may include information about an evaluation value of the target. For example, when the evaluation value of the target is 8, and an expression value of the target is 10, the evaluation value of the target does not reach the expression value of the target, and it is considered that the first intent is unfulfilled. When the evaluation value of the target is 10, and the expression value of the target is also 10, the evaluation value of the target reaches the expression value of the target, and it is considered that the first intent is fulfilled.

In an implementation, when the first parameter is the constraint, the first information may include information about an evaluation value of the constraint. For example, when the evaluation value of the constraint is 6, and an expression value of the constraint is 8, the evaluation value of the constraint does not reach the expression value of the constraint, and it is considered that the first intent is unfulfilled. When the evaluation value of the constraint is 8, and the expression value of the constraint is also 8, the evaluation value of the constraint reaches the expression value of the constraint, and it is considered that the first intent is fulfilled.

In an implementation, when the first parameter is the application area, the first information may include information about an evaluation value of the application area. For example, when the evaluation value of the application area is 5, and an expression value of the application area is 6, the evaluation value of the application area does not reach the expression value of the application area, it is considered that the first intent is unfulfilled. When the evaluation value of the application area is 5 and the expression value of the application area is also 5, the evaluation value of the application area reaches the expression value of the application area, and it is considered that the first intent is fulfilled.

In an implementation, when the first parameter is the fulfillment time, the first information may include information about an evaluation value of the fulfillment time. For example, when the evaluation value of the fulfillment time is 8, and an expression value of the fulfillment time is 9, the evaluation value of the fulfillment time does not reach the expression value of the fulfillment time, it is considered that the first intent is unfulfilled. When the evaluation value of the fulfillment time is 8, and the expression value of the fulfillment time is also 8, the evaluation value of the fulfillment time reaches the expression value of the fulfillment time, and it is considered that the first intent is fulfilled.

In an implementation, when the first parameter is the preference information, the first information may include information about an evaluation value of the preference information. For example, when the evaluation value of the preference information is 4, and an expression value of the preference information is 7, the evaluation value of the preference information does not reach the expression value of the preference information, and it is considered that the first intent is unfulfilled. When the evaluation value of the preference information is 7, and the expression value of the preference information is also 7, the evaluation value of the preference information reaches the expression value of the preference information, and it is considered that the first intent is fulfilled.

In an implementation, when the first parameter is the target and the application area, the first information may include information about evaluation values of the target and the application area. For example, when the evaluation values of the target and the application area are respectively 6 and 7, and expression values of the target and the application area are respectively 9 and 10, the evaluation values of the target and the application area do not reach the expression values of the target and the application area, and it is considered that the first intent is unfulfilled. When the evaluation values of the target and the application area are respectively 9 and 7, and the expression values of the target and the application area are respectively 9 and 10, the evaluation value of the application area does not reach the expression value of the application area, and it is considered that the first intent is unfulfilled. When the evaluation values of the target and the application area are respectively 6 and 7, and the expression values of the target and the application area are respectively 6 and 7, the evaluation values of the target and the application area reach the expression value of the target and the application area, and it is considered that the first intent is fulfilled.

In an implementation, when the first parameter is the target and the fulfillment time, the first information may include information about evaluation values of the target and the fulfillment time. For example, when the evaluation values of the target and the fulfillment time are respectively 3 and 5, and expression values of the target and the fulfillment time are respectively 6 and 6, the evaluation values of the target and the fulfillment time do not reach the expression values of the target and the fulfillment time, and it is considered that the first intent is unfulfilled. When the evaluation values of the target and the fulfillment time are respectively 6 and 4, and the expression values of the target and the fulfillment time are respectively 6 and 8, the evaluation value of the fulfillment time does not reach the expression value of the fulfillment time, and it is considered that the first intent is unfulfilled. When the evaluation values of the target and the fulfillment time are respectively 5 and 5, and the expression values of the target and the fulfillment time are respectively 5 and 5, the evaluation values of the target and the fulfillment time reach the expression values of the target and the fulfillment time, and it is considered that the first intent is fulfilled.

In an implementation, when the first parameter is the fulfillment time and the application area, the first information may include information about evaluation values of the fulfillment time and the application area. For example, when the evaluation values of the fulfillment time and the application area are respectively 7 and 8, and expression values of the fulfillment time and the application area are respectively 9 and 10, the evaluation values of the fulfillment time and the application area do not reach the expression values of the fulfillment time and the application area, and it is considered that the first intent is unfulfilled. When the evaluation values of the fulfillment time and the application area are respectively 7 and 8, and the expression values of the fulfillment time and the application area are respectively 7 and 10, the evaluation value of the application area does not reach the expression value of the application area, and it is considered that the first intent is unfulfilled. When the evaluation values of the fulfillment time and the application area are respectively 6 and 8, and the expression values of the fulfillment time and the application area are respectively 6 and 8, the evaluation values of the fulfillment time and the application area reach the expression values of the fulfillment time and the application area, and it is considered that the first intent is fulfilled.

In an implementation, when the first parameter is the target, the fulfillment time, and the application area, the first information may include information about evaluation values of the target, the fulfillment time, and the application area. For example, when the evaluation values of the target, the fulfillment time, and the application area are respectively 3, 4, and 5, and expression values of the target, the fulfillment time, and the application area are respectively 6, 7, and 8, the evaluation values of the target, the fulfillment time, and the application area do not reach the expression values of the target, the fulfillment time, and the application area, and it is considered that the first intent is unfulfilled. When the evaluation values of the target, the fulfillment time, and the application area are respectively 6, 7, and 8, and the expression values of the target, the fulfillment time, and the application area are respectively 6, 7, and 10, the evaluation value of the application area does not reach the expression value of the application area, and it is considered that the first intent is unfulfilled. When the evaluation values of the target, the fulfillment time, and the application area are respectively 3, 5, and 8, and the expression values of the target, the fulfillment time, and the application area are respectively 3, 5, and 8, the evaluation values of the target, the fulfillment time, and the application area reach the expression values of the target, the fulfillment time, and the application area, and it is considered that the first intent is fulfilled.

Optionally, before S410, the method 400 further includes S401. S401: The first device sends third information to the second device. Correspondingly, the second device receives the third information from the first device.

Specifically, the first device may send the third information to the second device. The third information includes information about a parameter that needs to be fed back by the second device, and the information about the parameter that needs to be fed back includes information about the first parameter.

Further, the third information may be intent creation request information sent by the first device to the second device, and the intent creation request information is used to request the second device to create the first intent. The intent creation request information further includes information about the first intent, for example, information about the expression of the first parameter.

In addition, after receiving the third information from the first device, the second device may calculate, based on the information about the parameter that needs to be fed back, the information about the expression of the first parameter, and the information about the evaluation value of the first parameter, a fulfillment status of the parameter that needs to be fed back. In addition, the fulfillment status of the parameter that needs to be fed back may be reflected by using specific values of an evaluation value and an expression value of the parameter that needs to be fed back.

In an implementation, the information that is about the parameter that needs to be fed back and that is included in the third information may be identification information of the parameter that needs to be fed back.

S420: When the evaluation value of the first parameter does not reach the expression value of the first parameter, the first device sends second information to the second device. Correspondingly, the second device receives the second information from the first device.

For example, after receiving the first information, the first device determines whether the evaluation value of the first parameter reaches the expression value of the first parameter. If the evaluation value of the first parameter does not reach the expression value of the first parameter, the first device sends the second information to the second device based on the first information. The second information is used to enable the evaluation value of the first parameter to reach the expression value of the first parameter.

In a possible implementation, the first information includes the information about the evaluation value of the first parameter, and the information may be a specific situation (for example, a value of the evaluation value of the first parameter) of whether the evaluation value of the first parameter reaches the expression value of the first parameter. In this way, the first device may determine, based on the specific situation of whether the evaluation value of the first parameter reaches the expression value of the first parameter, whether the evaluation value of the first parameter reaches the expression value of the first parameter. The first device knows the expression value of the first parameter. When the evaluation value of the first parameter does not reach the expression value of the first parameter, the first device sends the second information to the second device. The second information is used to enable the evaluation value of the first parameter to reach the expression value of the first parameter.

In another possible implementation, before S410, the method 400 further includes S402. S402: The second device modifies expressions of some or all parameters of the first parameter.

Specifically, after calculating a fulfillment status of the first parameter, the second device may modify, based on the fulfillment status of the first parameter, an expression of a parameter that is of the first parameter and whose evaluation value does not reach an expression value of the parameter.

Then, the second device may add modification indication information to the first information sent to the first device. The modification indication information includes information about modified expressions of some or all parameters of the first parameter, that is, a modified expression of the parameter that is of the first parameter and whose evaluation value does not reach the expression value of the parameter.

After receiving the first information including the modification indication information, the first device may accept or not accept modification of the expressions of some or all parameters of the first parameter by the second device.

In one aspect, when the first device accepts the modification of some or all parameters of the first parameter, the second information sent by the first device to the second device further indicates that the first device accepts the modification of some or all parameters of the first parameter by the second device.

Further, the method 400 further includes S421. S421: The first device sends at least one piece of first creation request information and/or first modification request information to the second device. Correspondingly, the second device receives the at least one piece of first creation request information and/or first modification request information from the first device.

Specifically, after the first device accepts the modification of some or all parameters of the first parameter, the second information sent by the first device to the second device further indicates that the first device accepts the modification of some or all parameters of the first parameter. In addition, the first device may send the at least one piece of first creation request information and/or first modification request information to the second device. The first creation request information is used to request to create a second intent, a parameter of the second intent includes at least one parameter of the first parameter, and the first modification request information indicates to modify an expression value of the at least one parameter of the first parameter.

For example, the first parameter of the first intent is the target and the fulfillment time. If the modification indication information sent by the second device to the first device includes modification information of the target and does not include modification information of the fulfillment time, the first device may send the first modification request information to the second device. The first modification request information may indicate to modify the expression value of the fulfillment time of the first parameter.

For example, the first parameter of the first intent is the target, the fulfillment time, and the application area. If the modification indication information sent by the second device to the first device includes modification information of the target and the fulfillment time and does not include modification information of the application area, the first device may send the first creation request information to the second device. The first creation request information indicates to create the second intent, and the parameter of the second intent includes a parameter such as the application area of the first parameter.

When expression values of parameters that are of the first parameter and whose evaluation values do not reach the expression values of the parameters are the same, one piece of creation request information may be sent. When the expression values of the parameters that are of the first parameter and whose evaluation values do not reach the expression values of the parameters are different, more than one piece of creation request information may be sent.

It should be understood that in the foregoing solution, if the first device accepts the modification of all the parameters of the first parameter by an intent management block of the second device, the first device may send only the second information to the second device, and does not need to send the at least one piece of first creation request information and/or first modification request information to the intent management block of the second device.

In another aspect, when the first device does not accept the modification of some or all parameters of the first parameter, the first device may send the second information to the second device, so that the evaluation value of the first parameter reaches the expression value of the first parameter.

In the foregoing technical solution, the second information includes second modification request information and/or at least one piece of second creation request information, the second modification request information indicates to modify the expression value of the parameter that is of the first parameter and whose evaluation value does not reach the expression value of the parameter, the second creation request information indicates to create a third intent, and a parameter of the third intent includes the parameter that is of the first parameter and whose evaluation value does not reach the expression value of the parameter.

For example, the first parameter of the first intent is the target and the fulfillment time. If the modification indication information sent by the second device to the first device includes the modification information of the target and the fulfillment time, the first device may send the second modification request information to the second device. The second modification request information may indicate to modify the expression values of the target and the fulfillment time of the first parameter.

For example, the first parameter of the first intent is the target and the application area. If the modification indication information sent by the second device to the first device includes the modification information of the target, the fulfillment time, and the application area, the first device may send the second creation request information to the second device. The second creation request information indicates to create the third intent, and parameters of the third intent include parameters such as the target and the application area that are of the first parameter.

In the foregoing solution, if the first device does not accept the modification of the expressions of some or all parameters of the first parameter, the first device may also send the second information to the second device. The second information indicates the second device to continue to use the first intent for communication.

It should be understood that in the foregoing solution, when the expression values of the parameters that are of the first parameter and whose evaluation values do not reach the expression values of the parameters are the same, one piece of creation request information may be sent. When the expression values of the parameters that are of the first parameter and whose evaluation values do not reach the expression values of the parameters are different, more than one piece of creation request information may be sent.

It should be further understood that in the foregoing solution, unless otherwise specified, there is no limitation on a sequence relationship between the steps, and there is no limitation on a causal relationship or another logical relationship between the steps. In addition, some of the steps are optional steps. An implementation is not limited in this application.

Based on the foregoing solution, the first device receives the first information from the second device. The first information includes the information about the evaluation value of the first parameter of the first intent. In addition, when the evaluation value of the first parameter does not reach the expression value of the first parameter, the first device sends, to the second device, information used to enable the evaluation value of the first parameter to reach the expression value of the first parameter. In this way, the first device may perform an intent management operation based on information about the evaluation value and the expression value of the first parameter of the first intent. For example, the first device sends, to the second device, the information used to enable the evaluation value of the first parameter to reach the expression value of the first parameter, so that the first device may purposefully adjust an expression value of an intent parameter to fulfill an intent. This avoids a case in which the expression value of the intent parameter is not properly adjusted because the first device cannot learn of a specific situation in which the intent is unfulfilled. In addition, the first device may send, to the second device, the information indicating the parameter that needs to be fed back by the second device, so that the second device feeds back information about the corresponding parameter to the first device, and the first device may learn of a reason why the intent parameter is unfulfilled. This avoids a case in which the first device can perform an operation on each field of the intent only based on guessing, and a large quantity of negotiations exist between the first device and the second device, saves system operation and maintenance resources, and improves system running performance.

Figure 5:
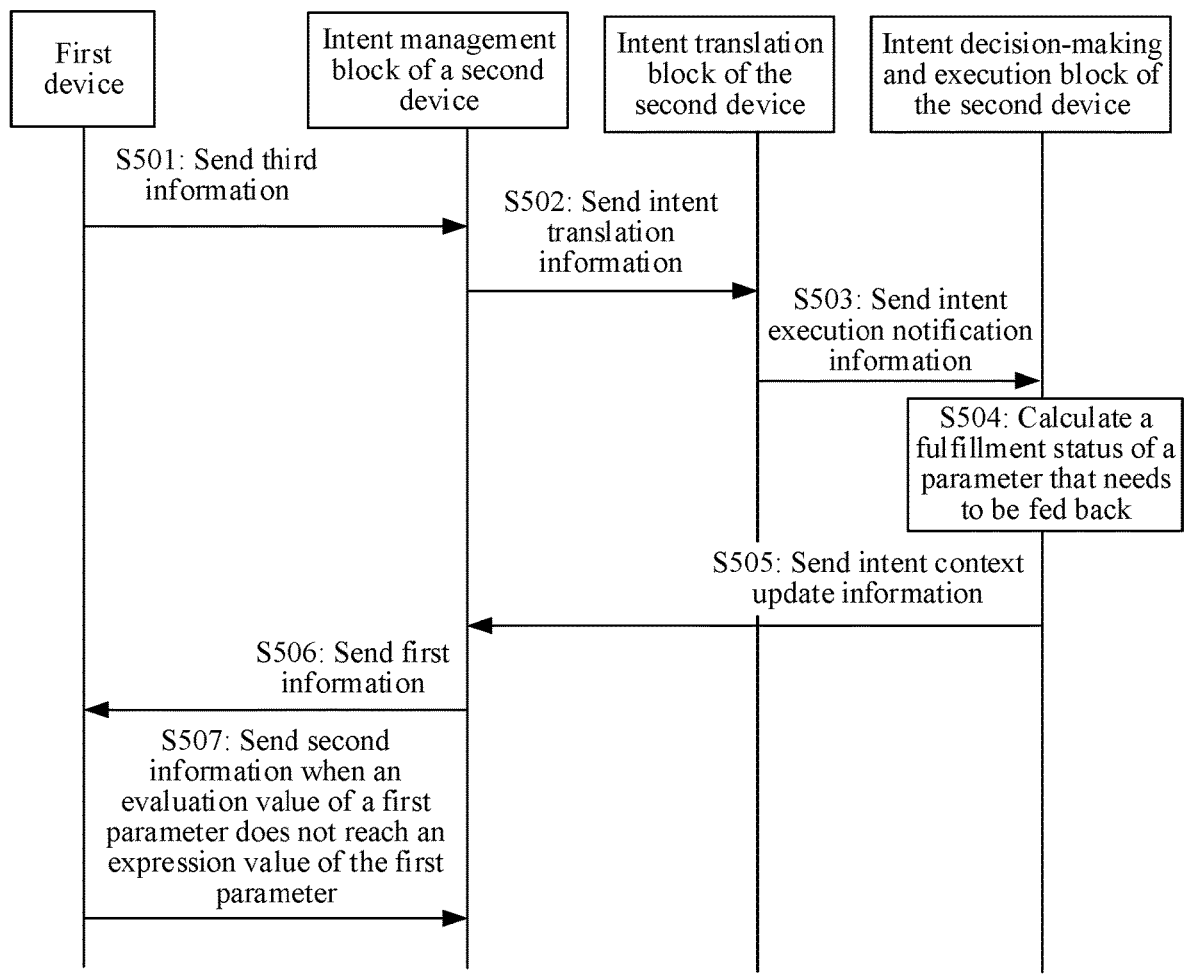
FIG. 5 is a schematic diagram of a communication method 500 according to an embodiment of this application.

FIG. 5 is a schematic diagram of a communication method 500 according to an embodiment of this application. As shown in FIG. 5, the method 500 includes the following steps.

S501: A first device sends third information to an intent management block of a second device. Correspondingly, the intent management block of the second device receives the third information from the first device.

For example, the first device may send the third information to the intent management block of the second device. The third information includes information about a parameter that needs to be fed back by the second device, the information about the parameter that needs to be fed back includes information about a first parameter, and the first parameter is a parameter of a first intent.

For related descriptions of the first parameter and the third information, refer to descriptions of the first parameter and the third information in S410. For brevity, details are not described herein in this application.

S502: The intent management block of the second device sends intent translation information to an intent translation block of the second device. Correspondingly, the intent translation block of the second device receives the intent translation information from the intent management block of the second device.

For example, after receiving the third information from the first device, the intent management block of the second device may send the intent translation information to the intent translation block of the second device. The intent translation information includes the information about the parameter that needs to be fed back and information about an expression of the first parameter.

In an implementation, the information about the parameter that needs to be fed back may be identification information of the parameter that needs to be fed back.

S503: The intent translation block of the second device sends intent execution notification information to an intent decision-making and execution block of the second device. Correspondingly, the intent decision-making and execution block of the second device receives the intent execution notification information from the intent translation block of the second device.

For example, after receiving the intent translation information from the intent management block of the second device, the intent translation block of the second device may send the intent execution notification information to the intent decision-making and execution block of the second device. The intent execution notification information includes the information about the parameter that needs to be fed back and the information about the expression of the first parameter.

S504: The intent decision-making and execution block of the second device calculates a fulfillment status of the parameter that needs to be fed back.

For example, after receiving the intent execution notification information including the information about the parameter that needs to be fed back and the information about the expression of the first parameter, the second device may calculate, based on information about an evaluation value of the first parameter, the information about the expression of the first parameter, and information about an evaluation value of the parameter that needs to be fed back, the fulfillment status of the parameter that needs to be fed back.

In an implementation, the fulfillment status of the parameter that needs to be fed back may be reflected by using specific values of the evaluation value and an expression value of the parameter that needs to be fed back.

S505: The intent decision-making and execution block of the second device sends intent context update information to the intent management block of the second device. Correspondingly, the intent management block of the second device receives the intent context update information from the intent decision-making and execution block of the second device.

For example, after calculating the fulfillment status of the parameter that needs to be fed back, the intent decision-making and execution block of the second device may send the intent context update information to the intent management block of the second device. The intent context update information includes information about the fulfillment status of the parameter that needs to be fed back.

S506: The intent management block of the second device sends first information to the first device. Correspondingly, the first device receives the first information from the intent management block of the second device.

For example, after receiving the intent context update information, the intent management block of the second device may send the first information to the first device. The first information includes the information about the evaluation value of the first parameter. For example, the information may be information about the specific value of the evaluation value of the first parameter.

Specifically, for descriptions of the first information, refer to related descriptions of the first information in S410. For brevity, details are not described herein in this application.

S507: When the evaluation value of the first parameter does not reach an expression value of the first parameter, the first device sends second information to the second device. Correspondingly, the second device receives the second information from the first device.

For example, after receiving the first information, the first device determines whether the evaluation value of the first parameter reaches the expression value of the first parameter. The first device knows the expression value of the first parameter. If the evaluation value of the first parameter does not reach the expression value of the first parameter, the first device sends the second information to the second device based on the first information. The second information is used to enable the evaluation value of the first parameter to reach the expression value of the first parameter. For example, the second information may indicate that the first device accepts modification of some or all parameters of the first parameter.

Specifically, the first device may determine, based on a specific situation of whether the evaluation value of the first parameter reaches the expression value of the first parameter, whether the evaluation value of the first parameter reaches the expression value of the first parameter. When the evaluation value of the first parameter does not reach the expression value of the first parameter, the first device sends the second information to the second device. The second information is used to enable the evaluation value of the first parameter to reach the expression value of the first parameter.

The second information includes second modification request information and/or at least one piece of second creation request information, the second modification request information indicates to modify an expression value of a parameter that is of the first parameter and whose evaluation value does not reach the expression value of the parameter, the second creation request information indicates to create a third intent, and a parameter of the third intent includes the parameter that is of the first parameter and whose evaluation value does not reach the expression value of the parameter.

It should be understood that in the foregoing solution, when expression values of the parameters that are of the first parameter and whose evaluation values do not reach the expression values of the parameters are the same, one piece of creation request information may be sent. When the expression values of the parameters that are of the first parameter and whose evaluation values do not reach the expression values of the parameters are different, more than one piece of creation request information may be sent.

It should be further understood that in the foregoing solution, unless otherwise specified, there is no limitation on a sequence relationship between the steps, and there is no limitation on a causal relationship or another logical relationship between the steps. In addition, some of the steps are optional steps. An implementation is not limited in this application.

Based on the foregoing solution, an information element may be added to the intent translation information and the intent execution notification information to indicate the parameter that needs to be fed back by the second device. The information element may be added to the intent context update information to indicate the fulfillment status of the parameter that needs to be fed back and that is obtained through calculation.

In addition, the first device receives the first information from the intent management block of the second device, and sends the second information to the intent management block of the second device when the evaluation value of the first parameter does not reach the expression value of the first parameter. In this way, the first device may perform an intent management operation based on the information about the evaluation value and the expression value of the first parameter of the first intent. For example, the first device sends, to the intent management block of the second device, information used to enable the evaluation value of the first parameter to reach the expression value of the first parameter, so that the first device may purposefully adjust an expression value of an intent parameter to fulfill an intent. This avoids a case in which the expression value of the intent parameter is not properly adjusted because the first device cannot learn of a specific situation in which the intent is unfulfilled. In addition, the first device may send, to the intent management block of the second device, the information indicating the parameter that needs to be fed back by the second device, so that the intent management block of the second device feeds back information about the corresponding parameter to the first device. This avoids a case in which the first device can perform an operation on each field of the intent only based on guessing, and a large quantity of negotiations exist between the first device and the second device, saves system operation and maintenance resources, and improves system running performance.

Figure 6:
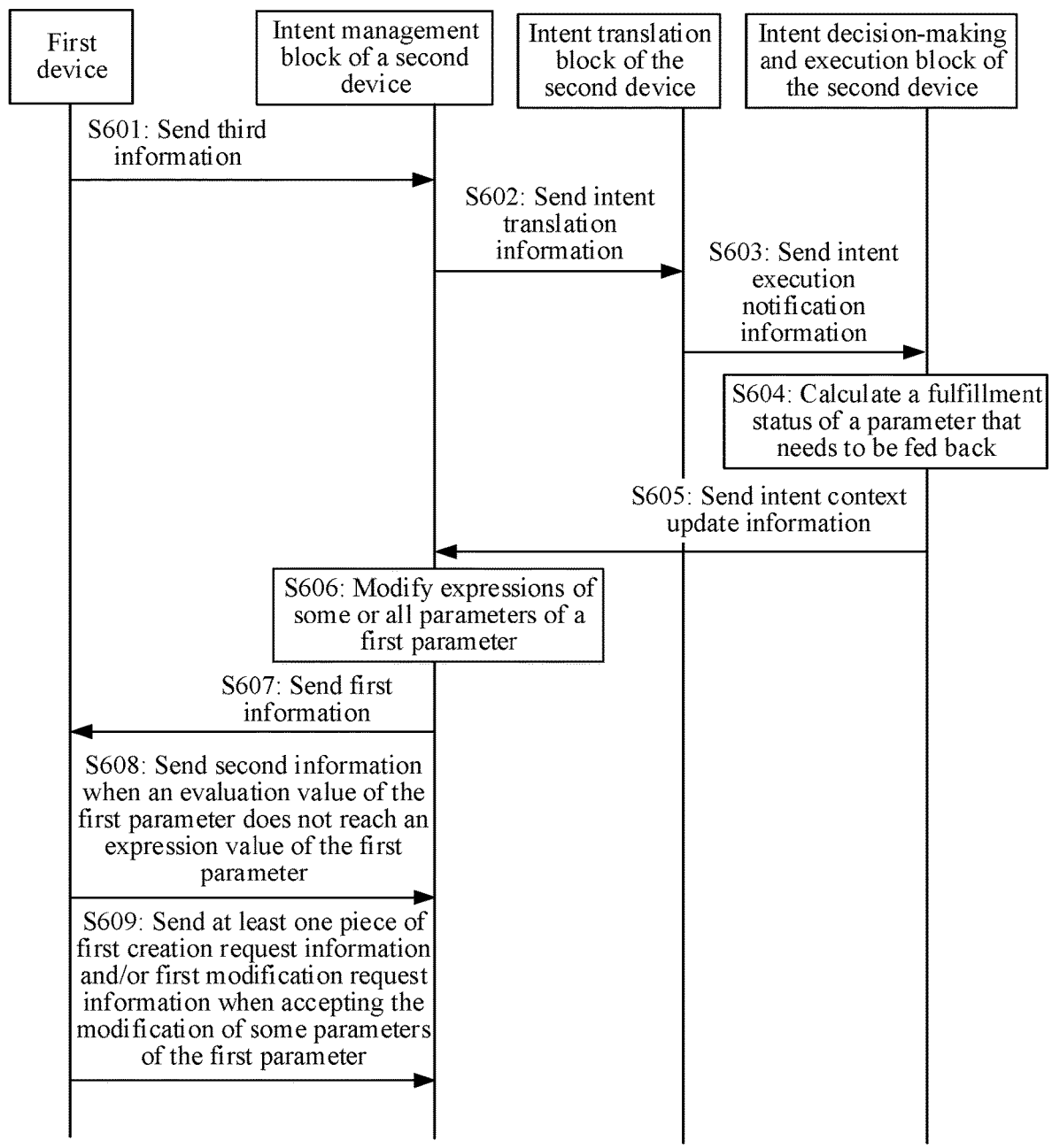
FIG. 6 is a schematic diagram of a communication method 600 according to an embodiment of this application.

FIG. 6 is a schematic diagram of a communication method 600 according to an embodiment of this application. As shown in FIG. 6, the method 600 includes the following steps.

S601: A first device sends third information to an intent management block of a second device. Correspondingly, the intent management block of the second device receives the third information from the first device.

For example, the first device may send the third information to the intent management block of the second device. The third information includes information about a parameter that needs to be fed back by the second device, the information about the parameter that needs to be fed back includes information about a first parameter, and the first parameter is a parameter of the first intent.

For related descriptions of the first parameter and the third information, refer to descriptions of the first parameter and the third information in S410. For brevity, details are not described herein in this application.

S602: The intent management block of the second device sends intent translation information to an intent translation block of the second device. Correspondingly, the intent translation block of the second device receives the intent translation information from the intent management block of the second device.

For example, after receiving the third information from the first device, the intent management block of the second device may send the intent translation information to the intent translation block of the second device. The intent translation information includes the information about the parameter that needs to be fed back and information about an expression of the first parameter.

In an implementation, the information about the parameter that needs to be fed back may be identification information of the parameter that needs to be fed back.

S603: The intent translation block of the second device sends intent execution notification information to an intent decision-making and execution block of the second device. Correspondingly, the intent decision-making and execution block of the second device receives the intent execution notification information from the intent translation block of the second device.

For example, after receiving the intent translation information from the intent management block of the second device, the intent translation block of the second device may send the intent execution notification information to the intent decision-making and execution block of the second device. The intent execution notification information includes the information about the parameter that needs to be fed back and the information about the expression of the first parameter.

S604: The intent decision-making and execution block of the second device calculates a fulfillment status of the parameter that needs to be fed back.

For example, after receiving the intent execution notification information including the information about the parameter that needs to be fed back and the information about the expression of the first parameter, the second device may calculate, based on information about an evaluation value of the first parameter, the information about the expression of the first parameter, and information about an evaluation value of the parameter that needs to be fed back, the fulfillment status of the parameter that needs to be fed back.

In an implementation, the fulfillment status of the parameter that needs to be fed back may be reflected by using specific values of the evaluation value and an expression value of the parameter that needs to be fed back.

S605: The intent decision-making and execution block of the second device sends intent context update information to the intent management block of the second device. Correspondingly, the intent management block of the second device receives the intent context update information from the intent decision-making and execution block of the second device.

For example, after calculating the fulfillment status of the parameter that needs to be fed back, the intent decision-making and execution block of the second device may send the intent context update information to the intent management block of the second device. The intent context update information includes information about the fulfillment status of the parameter that needs to be fed back.

S606: The intent management block of the second device modifies expressions of some or all parameters of the first parameter.

Specifically, after receiving the intent context update information, the intent management block of the second device may modify, based on a fulfillment status of the first parameter, an expression of a parameter that is of the first parameter and whose evaluation value does not reach an expression value of the parameter.

S607: The intent management block of the second device sends first information to the first device. Correspondingly, the first device receives the first information from the intent management block of the second device.

For example, after modifying the expression of the parameter that is of the first parameter and whose evaluation value does not reach the expression value of the parameter, the intent management block of the second device may send the first information to the first device. The first information includes the information about the evaluation value of the first parameter and modification indication information. The modification indication information includes information about modified expressions of some or all parameters of the first parameter, that is, a modified expression of the parameter that is of the first parameter and whose evaluation value does not reach the expression value of the parameter.

S608: When the evaluation value of the first parameter does not reach the expression value of the first parameter, the first device sends second information to the intent management block of the second device. Correspondingly, the intent management block of the second device receives the second information from the first device.

For example, after receiving the first information, the first device may determine whether the evaluation value of the first parameter reaches the expression value of the first parameter. The first device knows the expression value of the first parameter. When the evaluation value of the first parameter does not reach the expression value of the first parameter, the first device sends the second information to the intent management block of the second device. The second information is used to enable the evaluation value of the first parameter to reach the expression value of the first parameter.

Specifically, after receiving the first information, the first device may determine whether the evaluation value of the first parameter reaches the expression value of the first parameter. Further, the first information includes the modification indication information, and the first device may accept or not accept the modification of expressions of some or all parameters of the first parameter by the intent management block of the second device.

In an implementation, when the first device does not accept the modification of some parameters of the first parameter, the first device may send the second information to the intent management block of the second device. The second information includes at least one piece of second creation request information and/or second modification request information. The second modification request information indicates to modify an expression value of at least one parameter of the first parameter, the second creation request information indicates to create a third intent, and a parameter of the third intent includes the at least one parameter of the first parameter.

It should be understood that in the foregoing solution, if the first device does not accept the modification of the expressions of all the parameters of the first parameter, the first device may also send the second information to the intent management block of the second device. The second information indicates the second device to continue to use the first intent for communication.

S609: When accepting the modification of some parameters of the first parameter, the first device sends at least one piece of first creation request information and/or first modification request information to the intent management block of the second device. Correspondingly, the intent management block of the second device receives the at least one piece of first creation request information and/or first modification request information from the first device.

For example, the first device may send the at least one piece of first creation request information and/or first modification request information to the intent management block of the second device.

When the first device accepts the modification of some or all parameters of the first parameter, the second information sent by the first device to the intent management block of the second device further indicates that the first device accepts the modification of some or all parameters of the first parameter by the intent management block of the second device.

Specifically, for related descriptions of the first creation request information and the first modification request information, refer to descriptions of the first creation request information and the first modification request information in S421. For brevity, details are not described herein in this application.

In the foregoing solution, if the first device accepts the modification of all the parameters of the first parameter by the intent management block of the second device, the first device may send only the second information to the second device, and does not need to send the at least one piece of first creation request information and/or first modification request information to the intent management block of the second device.

It should be understood that in the foregoing solution, when expression values of the parameters that are of the first parameter and whose evaluation values do not reach the expression values of the parameters are the same, one piece of creation request information may be sent. When the expression values of the parameters that are of the first parameter and whose evaluation values do not reach the expression values of the parameters are different, more than one piece of creation request information may be sent.

It should be further understood that in the foregoing solution, unless otherwise specified, there is no limitation on a sequence relationship between the steps, and there is no limitation on a causal relationship or another logical relationship between the steps. In addition, some of the steps are optional steps. An implementation is not limited in this application.

Based on the foregoing solution, an information element may be added to the intent translation information and the intent execution notification information to indicate the parameter that needs to be fed back by the second device. The information element may be added to the intent context update information, to indicate the fulfillment status of the parameter that needs to be fed back and that is obtained through calculation. The intent management block of the second device may modify an expression of an intent parameter based on obtained intent fulfillment details, return feedback information to the first device, and send a modified expression of the intent parameter and the intent fulfillment details to the first device.

In addition, the first device receives the first information from the intent management block of the second device, and sends the second information to the intent management block of the second device when the evaluation value of the first parameter does not reach the expression value of the first parameter. In this way, the first device may perform an intent management operation based on the information about the evaluation value and the expression value of the first parameter of the first intent and the modification indication information. For example, the first device sends, to the intent management block of the second device, the information used to enable the evaluation value of the first parameter to reach the expression value of the first parameter, so that the first device may purposefully adjust an expression value of an intent parameter to fulfill an intent. This avoids a case in which the expression value of the intent parameter is not properly adjusted because the first device cannot learn of a specific situation in which the intent is unfulfilled. In addition, the first device may send, to the intent management block of the second device, the information indicating the parameter that needs to be fed back by the second device, so that the intent management block of the second device feeds back information about the corresponding parameter to the first device. This avoids a case in which the first device can perform an operation on each field of the intent only based on guessing, and a large quantity of negotiations exist between the first device and the second device, saves system operation and maintenance resources, and improves system running performance.

Embodiments described in this specification may be independent solutions, or may be combined based on internal logic. All these solutions fall within the protection scope of this application.

It may be understood that in the foregoing method embodiments, methods and operations implemented by a network device (for example, the first device and/or the second device) may also be implemented by a component (for example, a chip or a circuit) that can be used in the network device.

The foregoing describes in detail the methods provided in embodiments of this application with reference to FIG. 4 to FIG. 6. The following describes in detail communication apparatuses provided in embodiments of this application with reference to FIG. 7 to FIG. 9. It should be understood that descriptions of the apparatus embodiments correspond to descriptions of the method embodiments. Therefore, for content that is not described in detail, refer to the foregoing method embodiments. For brevity, details are not described herein again.

The foregoing mainly describes the solutions provided in embodiments of this application from the perspective of interaction between network elements. It may be understood that, to implement the foregoing functions, each network element such as a transmit end device or a receiving end device includes a corresponding hardware structure and/or software module for performing each function. A person skilled in the art may be aware that with reference to the examples described in embodiments disclosed in this specification, units and algorithm steps can be implemented by hardware or a combination of computer software and hardware in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, functional modules of the transmit end device or the receiving end device may be obtained through division based on the foregoing method examples. For example, each functional module may be obtained through division based on each function, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used. An example in which each functional module is obtained through division based on each corresponding function is used below for description.

Figure 7:
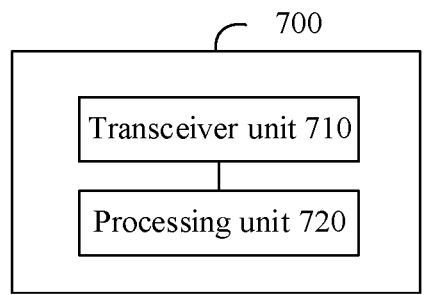
FIG. 7 is a schematic block diagram of a communication apparatus 700 according to an embodiment of this application.

FIG. 7 is a schematic block diagram of a communication apparatus 700 according to an embodiment of this application. The communication apparatus 700 includes a transceiver unit 710 and a processing unit 720. The transceiver unit 710 may implement a corresponding communication function, and the processing unit 710 is configured to perform data processing. The transceiver unit 710 may also be referred to as a communication interface or a communication unit.

Optionally, the communication apparatus 700 may further include a storage unit. The storage unit may be configured to store instructions and/or data. The processing unit 720 may read the instructions and/or the data in the storage unit, to enable the communication apparatus to implement the foregoing method embodiments.

The communication apparatus 700 may be configured to perform actions performed by a network device in the foregoing method embodiments. The network device includes a first device and a second device. In this case, the communication apparatus 700 may be the network device or a component that can be configured in the network device. The transceiver unit 710 is configured to perform a receiving and sending-related operation by a network device side (for example, the first device and/or the second device) in the foregoing method embodiments. The processing unit 720 is configured to perform a processing-related operation by the network device side (for example, the first device and/or the second device) in the foregoing method embodiments.

In a design, the communication apparatus 700 is configured to perform actions performed by the first device in the embodiments shown in FIG. 4, FIG. 5, or FIG. 6.

In an example, the communication apparatus 700 is configured to perform actions performed by the second device in the embodiments shown in FIG. 4, FIG. 5, or FIG. 6.

The communication apparatus 700 may implement steps or processes performed by the network device (for example, the first device and/or the second device) in the method 400 to the method 600 in embodiments of this application. The communication apparatus 700 may include units configured to perform the methods performed by the network device (for example, the first device and/or the second device) in the method 400 in FIG. 4 to the method 600 in FIG. 6. In addition, units in the communication apparatus 700 and the foregoing other operations and/or functions are respectively used to implement corresponding processes of the method 400 in FIG. 4 to the method 600 in FIG. 6.

It should be understood that a specific process in which the units perform the foregoing corresponding steps is described in detail in the foregoing method embodiments, and for brevity, details are not described herein.

The processing unit 720 in the foregoing embodiment may be implemented by at least one processor or a processor-related circuit. The transceiver unit 710 may be implemented by a transceiver or a transceiver-related circuit. The transceiver unit 710 may also be referred to as a communication unit or a communication interface. The storage unit may be implemented by at least one memory.

Figure 8:
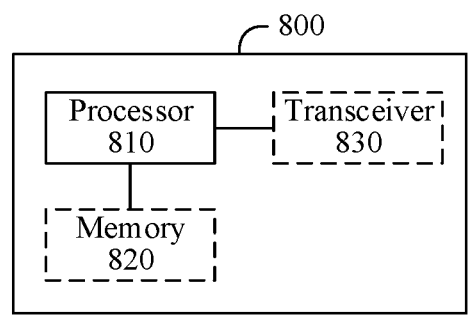
FIG. 8 is a schematic block diagram of a communication apparatus 800 according to an embodiment of this application.

As shown in FIG. 8, an embodiment of this application further provides a communication apparatus 800. The communication apparatus 800 includes a processor 810. The processor 810 is coupled to a memory 820. The memory 820 is configured to store a computer program or instructions and/or data. The processor 810 is configured to execute the computer program or the instructions and/or the data stored in the memory 820, so that the method in the foregoing method embodiments is performed.

Optionally, the communication apparatus 800 includes one or more processors 810.

Optionally, as shown in FIG. 8, the communication apparatus 800 may further include the memory 820.

Optionally, the communication apparatus 800 may include one or more memories 820.

Optionally, the memory 820 and the processor 810 may be integrated with each other, or disposed separately.

Optionally, as shown in FIG. 8, the communication apparatus 800 may further include a transceiver 830, and the transceiver 830 is configured to receive and/or send a signal. For example, the processor 810 is configured to control the transceiver 830 to receive and/or send the signal.

In a solution, the communication apparatus 800 is configured to implement operations performed by a network device (for example, a first device and/or a second device) in the foregoing method embodiments.

For example, the processor 810 is configured to implement processing-related operations performed by the network device (for example, the first device and/or the second device) in the foregoing method embodiments, and the transceiver 830 is configured to implement receiving and sending-related operations performed by the network device (for example, the first device and/or the second device) in the foregoing method embodiments.

An embodiment of this application further provides a communication apparatus 900. The communication apparatus 900 may be a network device or a chip. The communication apparatus 900 may be configured to perform operations performed by a network device in the foregoing method embodiments. The network device may include a first device and/or a second device.

Figure 9:
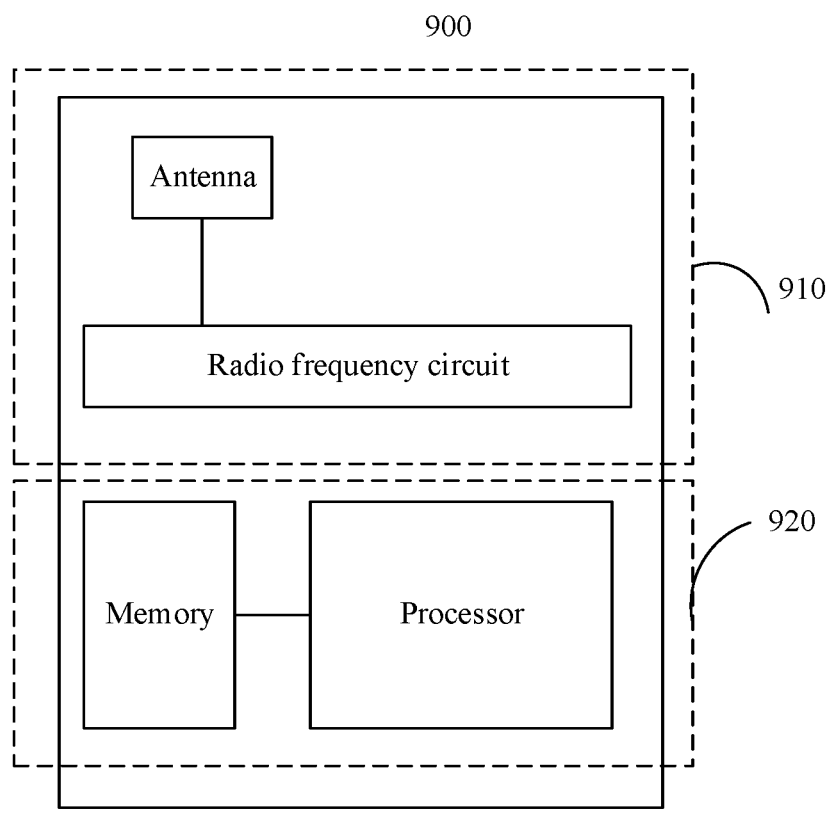
FIG. 9 is a simplified schematic diagram of a structure of a network device 900 according to an embodiment of this application.

The communication apparatus 900 may be the network device, for example, a base station. FIG. 9 is a simplified schematic diagram of a structure of a network device 900 according to an embodiment of this application. The base station includes a part 910 and a part 920. The part 910 is mainly configured to receive and send a radio frequency signal and perform conversion between the radio frequency signal and a signal. The part 920 is mainly configured to process a signal, control a network device, and the like. The part 910 may be generally referred to as a transceiver unit, a transceiver machine, a transceiver circuit, a transceiver, or the like. The part 920 is generally a control center of the network device (for example, the first device and/or the second device), and may be generally referred to as a processing unit, and is configured to control the base station to perform processing operations on a network device side (for example, the first device and/or the second device) in the foregoing method embodiments.

The transceiver unit in the part 910 may also be referred to as a transceiver machine, a transceiver, or the like, and includes an antenna and a radio frequency circuit. The radio frequency circuit is mainly configured to perform radio frequency processing. Optionally, a component that is of the part 910 and that is configured to implement a receiving function may be construed as a receiving unit, and a component that is configured to implement a sending function may be construed as a sending unit. In other words, the part 910 includes the receiving unit and the sending unit. The receiving unit may also be referred to as a receiving machine, a receiver, a receiving circuit, or the like. The sending unit may be referred to as a transmitter machine, a transmitter, a transmitting circuit, or the like.

The part 920 may include one or more boards, and each board may include one or more processors and one or more memories. The processor is configured to read and execute a program in the memory, to implement a signal processing function and control the network device. If there are a plurality of boards, the boards may be interconnected with each other, to enhance a processing capability. In an optional implementation, a plurality of boards may share one or more processors, or a plurality of boards share one or more memories, or a plurality of boards share one or more processors at the same time.

For example, in an implementation, the transceiver unit of the part 910 is configured to perform receiving and sending-related steps performed by the first device in the embodiments shown in FIG. 4, FIG. 5, or FIG. 6, and the part 920 is configured to perform processing-related steps performed by the first device in the embodiments shown in FIG. 4, FIG. 5, or FIG. 6.

For example, in still another implementation, the transceiver unit of the part 910 is configured to perform sending and receiving-related steps performed by the second device in the embodiments shown in FIG. 4, FIG. 5, or FIG. 6, and the part 920 is configured to perform processing-related steps performed by the second device in the embodiments shown in FIG. 4, FIG. 5, or FIG. 6.

It should be understood that FIG. 9 is merely an example instead of a limitation. The network device including the transceiver unit and the processing unit may not depend on the structure shown in FIG. 9.

When the communication apparatus 900 is a chip, the chip includes a transceiver unit and a processing unit. The transceiver unit may be an input/output circuit or a communication interface. The processing unit is a processor, a microprocessor, or an integrated circuit integrated on the chip.

An embodiment of this application further provides a computer-readable storage medium. The computer-readable storage medium stores computer instructions used to implement the method performed by a network device (for example, a first device and/or a second device) in the foregoing method embodiments.

For example, when the computer program is executed by a computer, the computer is enabled to implement the method executed by the network device (for example, the first device and/or the second device) in the foregoing method embodiments.

An embodiment of this application further provides a computer program product including instructions. When the instructions are executed by a computer, the computer is enabled to implement the method performed by a network device (for example, a first device and/or a second device) in the foregoing method embodiments.

An embodiment of this application further provides a communication system. The communication system includes a first device and a second device in the foregoing embodiments.

It may be clearly understood by a person skilled in the art that, for the purpose of convenient and brief description, for explanations of related content and beneficial effects in any of the foregoing provided communication apparatuses, refer to corresponding method embodiments provided above. Details are not described herein again.

In embodiments of this application, a network device may include a hardware layer, an operating system layer operation above the hardware layer, and an application layer operation above the operating system layer. The hardware layer may include hardware such as a central processing unit (central processing unit, CPU), a memory management unit (memory management unit, MMU), and memory (also referred to as main memory). An operating system at the operating system layer may be any one or more computer operating systems that implement service processing by using a process (process), for example, a Linux operating system, a Unix operating system, an Android operating system, an iOS operating system, or a Windows operating system. The application layer may include applications such as a browser, an address book, word processing software, and instant messaging software.

A specific structure of an execution body of the method provided in embodiments of this application is not particularly limited in embodiments of this application, provided that communication can be performed according to the method provided in embodiments of this application by operating a program that records code of the method provided in embodiments of this application. For example, the method provided in embodiments of this application may be executed by the network device, or a functional module in the network device that can invoke and execute a program.

Various aspects or features of this application may be implemented as methods, apparatuses, or products using standard programming and/or engineering techniques. As used herein, the term "artificial article" may encompass a computer program accessible from any computer-readable device, carrier, or medium.

The computer-readable storage medium may be any usable medium accessible by the computer, or a data storage device, for example, a server or a data center, integrating one or more usable media. The usable medium (or the computer-readable medium) may include, for example, but is not limited to, various media that can store program code such as a magnetic medium or a magnetic storage device (for example, a floppy disk, a hard disk (for example, a removable hard disk), or a magnetic tape), an optical medium (for example, an optical disc, a compact disc (compact disc, CD), or a digital versatile disc (digital versatile disc, DVD)), a smart card, and a flash memory device (for example, an erasable programmable read-only memory (erasable programmable read-only memory, EPROM), a card, a stick, or a key drive), or a semiconductor medium (for example, a solid state disk (solid state disk, SSD), a USB flash drive, a read-only memory (read-only memory, ROM), or a random access memory (random access memory, RAM)).

The various storage media described herein may represent one or more devices and/or other machine-readable media for storing information. The term "machine-readable medium" may include, but is not limited to: radio channels and various other media capable of storing, containing, and/or carrying instructions and/or data.

It should be understood that, the processor mentioned in embodiments of this application may be a central processing unit (central processing unit, CPU), and may further be another general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or a transistor logic device, a discrete hardware component, or the like. The general-purpose processor may be a microprocessor, or the processor may be any conventional processor or the like.

It may be understood that the memory mentioned in embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM). For example, the RAM can be used as an external cache. By way of example, and not limitation, the RAM may include the following plurality of forms: a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general-purpose processor, a DSP, an ASIC, an FPGA or another programmable logic device, a discrete gate or a transistor logic device, or a discrete hardware component, a memory (storage module) may be integrated into the processor.

It should further be noted that the memory described herein is intended to include, but is not limited to, these and any other suitable type of memory.

In the several embodiments provided in this application, it should be understood that the disclosed apparatus and method may be implemented in other manners. For example, the foregoing apparatus embodiments are only examples. For example, division into the foregoing units is only logical function division, and may be another division manner in an actual implementation. For example, a plurality of units or components may be combined or integrated into another system, or some features may be ignored or not performed. In addition, the displayed or discussed mutual couplings, direct couplings, or communication connections may be implemented through some interfaces. Indirect couplings or communication connections between the apparatuses or units may be implemented in an electrical form, a mechanical form, or another form.

The foregoing units described as separate parts may or may not be physically separate, and parts displayed as units may or may not be physical units, may be located in one position, or may be distributed on a plurality of network units. A part or all of the units may be selected based on actual requirements to implement the solutions provided in this application.

In addition, functional units in embodiments of this application may be integrated into one unit, each of the units may exist alone physically, or two or more units may be integrated into one unit.

All or some of the foregoing embodiments may be implemented by using software, hardware, firmware, or any combination thereof.

When software is used to implement the embodiments, all or a part of the embodiments may be implemented in a form of a computer program product. The computer program product includes one or more computer instructions. When the computer program instructions are loaded and executed on a computer, processes or functions according to embodiments of this application are all or partially generated. The computer may be a general-purpose computer, a dedicated computer, a computer network, or other programmable apparatuses. For example, the computer may be a personal computer, a server, or a network device. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. For the computer-readable storage medium, refer to the foregoing descriptions.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims and this specification.

What is claimed is:

1. A communication method, comprising:
   receiving, by a first device from a second device, first information that comprises information about an evaluation value of a first parameter of a first intent and modification indication information that includes information about modified expressions of some or all parameters of the first parameter; and
   sending, by the first device, second information to the second device in response that the evaluation value of the first parameter does not reach an expression value of the first parameter, wherein the second information is used to enable the evaluation value of the first parameter to reach the expression value of the first parameter.

2. The method of claim 1, the method further comprising:
   sending, by the first device to the second device, third information that comprises information about a parameter that needs to be fed back by the second device, and the information about the parameter that needs to be fed back comprises information about the first parameter.

3. The method of claim 1, wherein the second information further indicates that the first device accepts modification of some or all parameters of the first parameter.

4. The method of claim 3, wherein when the first device accepts the modification of at least part of the first parameter, the method further comprises:
   sending, by the first device to the second device, at least one piece of first creation request information and/or first modification request information, wherein the first creation request information is used to request to create a second intent, a parameter of the second intent comprises at least one parameter of the first parameter, and the first modification request information indicates to modify an expression value of the at least one parameter of the first parameter.

5. The method of claim 1, wherein the second information further indicates that the first device does not accept modification of some or all parameters of the first parameter.

6. The method of claim 1, wherein the second information comprises second modification request information and/or at least one piece of second creation request information, the second modification request information indicates to modify an expression value of a parameter that is of the first parameter and whose evaluation value does not reach the expression value of the parameter, the second creation request information indicates to create a third intent, and a parameter of the third intent comprises the parameter that is of the first parameter and whose evaluation value does not reach the expression value of the parameter.

7. The method of claim 1, wherein the first parameter comprises at least one of the following parameters: a target, a constraint, an application area, preference information, or fulfillment time.

8. A communication method, comprising:
   modifying, by a second device, expressions of some or all parameters of a first parameter of a first intent;
   sending, by the second device to a first device, first information comprising information about an evaluation value of the first parameter of the first intent; and
   receiving, by the second device from the first device, second information that is used to enable the evaluation value of the first parameter to reach an expression value of the first parameter.

9. The method of claim 8, the method further comprising:
   receiving, by the second device from the first device, third information that comprises information about a parameter that needs to be fed back by the second device, wherein the information about the parameter that needs to be fed back comprises information about the first parameter.

10. The method of claim 8, wherein the first information further comprises modification indication information that comprises information about modified expressions of some or all parameters of the first parameter.

11. The method of claim 10, wherein the second information further indicates that the first device accepts modification of some or all parameters of the first parameter.

12. The method of claim 11, the method further comprising:

receiving, by the second device from the first device, at least one piece of first creation request information and/or first modification request information, wherein the first creation request information is used to request to create a second intent, a parameter of the second intent comprises at least one parameter of the first parameter, and the first modification request information indicates to modify an expression value of the at least one parameter of the first parameter.

13. The method of claim 10, wherein the second information further indicates that the first device does not accept modification of some or all parameters of the first parameter.

14. The method of claim 8, wherein the second information comprises second modification request information and/or at least one piece of second creation request information, the second modification request information indicates to modify an expression value of a parameter that is of the first parameter and whose evaluation value does not reach the expression value of the parameter, the second creation request information indicates to create a third intent, and a parameter of the third intent comprises the parameter that is of the first parameter and whose evaluation value does not reach the expression value of the parameter.

15. The method of claim 8, wherein the information about the first parameter comprises at least one of the following parameters: a target, a constraint, an application area, preference information, or fulfillment time.

16. A communication apparatus, comprising:

a processor, and a memory storing computer instructions that, when executed by the processor, cause the communication apparatus to perform:

receiving first information from a second device, wherein the first information comprises information about an evaluation value of a first parameter of a first intent and modification indication information that includes information about modified expressions of some or all parameters of the first parameter; and sending second information to the second device in response that the evaluation value of the first parameter does not reach an expression value of the first parameter, wherein the second information is used to enable the evaluation value of the first parameter to reach the expression value of the first parameter.

17. A communication apparatus, comprising:

a processor, and a memory storing computer instructions that, when executed by the processor, cause the communication apparatus to perform:

modifying expressions of some or all parameters of a first parameter of a first intent;

sending first information comprising information about an evaluation value of the first parameter of the first intent; and receiving second information that is used to enable the evaluation value of the first parameter to reach an expression value of the first parameter.

* * * * *